Figure 1:
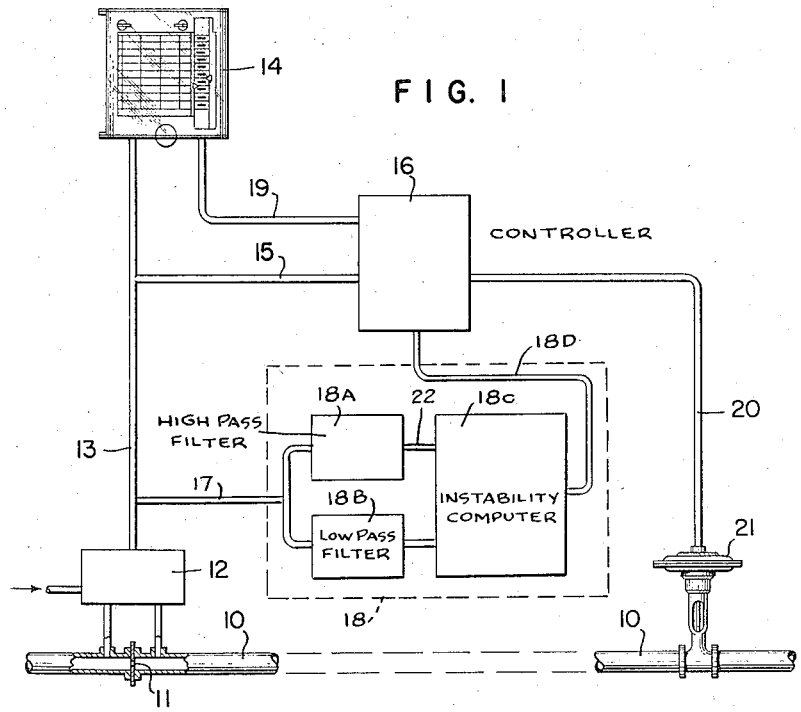

March 24, 1959  E. C. GROGAN ET AL  2,878,825
PNEUMATIC HIGH PASS FILTER
Filed Oct. 8, 1954

INVENTORS.
EDWARD C. GROGAN
DAVID W. PESSEN
BY
ATTORNEY.

United States Patent Office 2,878,825
Patented Mar. 24, 1959

2,878,825

PNEUMATIC HIGH PASS FILTER

Edward C. Grogan and David W. Pessen, Philadelphia, Pa., assignors to Minneapolis-Honeywell Regulator Company, Minneapolis, Minn., a corporation of Delaware Application October 8, 1954, Serial No. 461,081

9 Claims. (Cl. 137—82)

A general object of the present invention is to provide a new and improved apparatus for selecting a predetermined type of input signal. More specifically, the apparatus is concerned with a filtering apparatus for producing a pneumatic output signal which cyclically follows an input control signal when the frequency of the input signal is above a predetermined magnitude.

In a copending application of David W. Pessen, co-inventor of the present application, entitled "Control Apparatus," Serial No. 461,131, filed October 8, 1954 now Patent 2,834,363; issued May 13, 1958; there is disclosed an automatic control apparatus which is adapted to be self adjusting in its control parameters. These control parameters may include proportional band or gain changes, reset rate changes, and rate time changes. The controllers with which the present apparatus may be associated are generally applied to control the magnitude of some particular variable in a process. Such variable may be flow, temperature, pressure, or the like. The controller with its input signal from the process and its output connected back to the process forms a closed loop which may be subject to certain instabilities if the control parameters of the controller are not properly adjusted. One of the undesirable instabilities of such a process controller is evidenced by an oscillation of the controlled variable of the process. It is desirable that this oscillation of the variable be sensed and distinguished from long term offsets or deviation of the controlled variable from its desired value. The present invention, therefore, is directed to an apparatus for distinguishing the oscillations of a variable from long term offsets.

The present invention takes the form of a high pass filter. This high pass filter is arranged to produce an output signal only when the frequency rate of the input signal being monitored is above a certain range of frequencies.

It is accordingly a more specific object of the present invention to provide an improved high pass filter which will produce an output fluid pressure signal only when an applied signal has a frequency in a range above a predetermined value.

Another object of the present invention is to provide a high pass fluid pressure filter which has a chamber whose volume is adapted to be cyclically varied by an input signal and the output is connected to a signal utilization device with means for supplying a constant pressure signal to the output connection through a restriction which will maintain a substantially fixed pressure in the output in the absence of a pressure signal variation which is above a frequency range.

A further object of the present invention is to provide an improved high pass fluid pressure filter which comprises a chamber whose volume is periodically varied in accordance with the magnitude of a variable and that chamber has an output connection supplied with a pressure signal by a fluid pressure divider which has a tap connected to the chamber output.

A still further object of the present invention is to provide a high pass fluid pressure filter which includes a variable volume chamber with an output connection to a pressure utilization device and a supply pressure source for the output connection comprising a pressure divider having a capacity chamber therein and a restricted connection from said capacity chamber to the first named output connection.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 2:
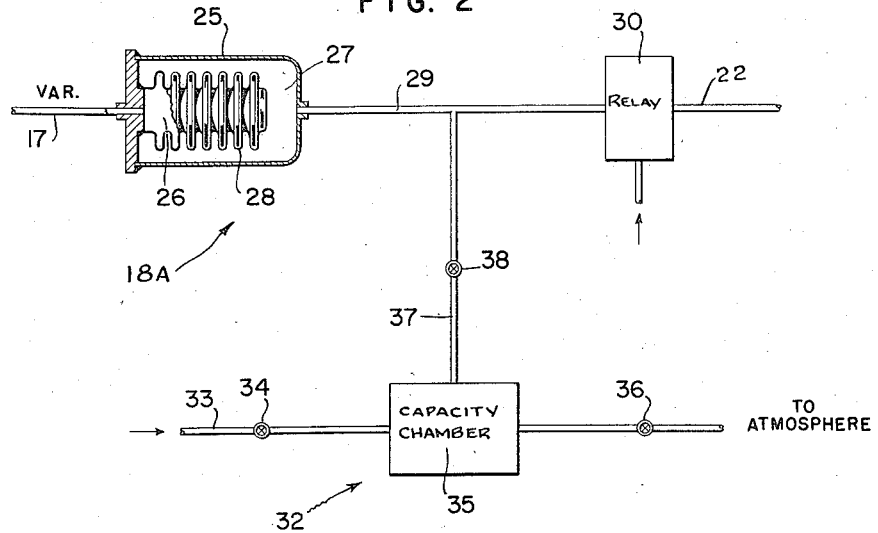

Of the drawings:

Fig. 1 is a schematic showing of a complete control system which incorporates the present invention as a part thereof; and Fig. 2 shows schematically a preferred form of high pass filter for use in the apparatus of Fig. 1.

Referring first to Fig. 1, the numeral 10 represents a fluid flow line which has an orifice plate 11 positioned therein. A differential pressure measuring device 12 is connected to sense the pressures across the orifice plate 11 and this device 12 will produce an output control pressure which is proportional to the rate of fluid flow through the pipe 10. This flow measuring device 12 may well take the form of the differential pressure converter of the type shown in the copending application of John B. Booth et al., Serial No. 248,358, filed September 26, 1951, now Patent 2,808,725; issued October 8, 1957. The output pressure from the converter 12 is passed by way of a signal transmitting conduit 13 to an indicating and recording instrument 14 of any desirable type. This signal from the conduit 13 is also fed through a conduit 15 to a pneumatic controller 16 which may be of the type mentioned in the above copending application of David W. Pessen. The signal from the conduit 13 also passes through a further conduit 17 to a stability meter 18. The stability meter 18 includes as an element thereof the high pass filter 18A shown in detail in Fig. 2. Also included in the stability meter is a low pass filter 18B and an instability computer 18C, the latter having an output fluid pressure conduit 18D connected to the controller 16. The high pass filter is connected to the instability computer by way of a conduit 22.

Also connected to the controller 16 is a set point signal conduit 19, said set point signal being derived from the indicator unit 14. The output signal from the controller 16 is connected by way of a conduit 20 to a control valve 21 which is arranged in fluid flow controlling relationship in the pipe 10.

The basic operation of the apparatus shown in Fig. 1 will be understood by considering the above mentioned Pessen application in detail. However, for purposes of explanation in this instance, it should be noted that the controller 16 will have an output control pressure in conduit 20 which will position the valve 21 to maintain a desired opening of the valve and thereby a predetermined fluid flow in the conduit 10. If there should be a change in the fluid flow, this will be detected by the differential pressure converter 12 which will supply an appropriate pressure signal by way of conduits 13 and 15 to the controller so that the controller output will change to a new control value tending to bring the fluid flow back to the desired point. It should also be noted that the set point may be adjusted in the instrument 14 so that a set point pressure is applied to the controller 16 by way of conduit 19 to vary the fluid flow in pipe 10.

As explained in detail in the above Pessen application, the stability meter 18 functions to automatically adjust the control parameters of the controller 16 in accordance with the sensed instabilities of the complete process which includes the controller 16, the valve 21, the fluid flowing in pipe 10, and the differential pressure converter 12. The pressure of any system instability will result in the pressure signal in conduit 17 varying in accordance with that instability. The high pass filter 18A and the low pass filter 18B will separate the instability signal into its component parts indicative of a steady state offset or a process oscillation. The respective signals are applied to the instability computer which in turn produces an output signal which is used to adjust the control parameter of the controller 16 to eliminate system instability. This configuration will serve to maintain an optimum set of operating conditions so that the fluid flow rate in the pipe 10 will be maintained at a desired value.

Referring now to Fig. 2, there is here shown a high pass filter 18A which may be suitable for use in the stability meter 18 of Fig. 1. This high pass filter comprises a first enclosure 25 which is divided into two chambers 26 and 27 by a bellows 28. The space 27 has an output conduit 29 which leads to a fluid pressure utilization device, such as instability computer 18C, by way of a relay 30 and thence through pipe 22. See Fig. 1. Supplying pressure to the conduit 29 is a pressure divider 32 which has fluid supplied thereto under pressure by an inlet conduit 33 which is connected to a theoretically infinitely large source of fluid at a constant pressure. Between inlet 33 and atmosphere in a series connection are an adjustable restriction 34, a capacity chamber 35, and a further adjustable restriction 36. The capacity chamber 35 is effectively a tap in a pressure divider formed by restrictions 34 and 36 and this tap has an outlet conduit 37 which leads through an adjustable restriction 38 to the output conduit 29 of the chamber 27.

In considering the operation of Fig. 2, it should first be noted that the fluid flowing through the inlet conduit 33 under pressure passes through a restriction 34, capacity chamber 35, and restriction 36 to atmosphere. Because of the two restrictions 34 and 36 being in this line, there is formed a pressure divider with a pressure between the two restrictions being dependent upon the relative magnitude of the two restrictions. The pressure between the two restrictions will be stored in the capacity chamber 35 and will remain substantially constant as long as the supply pressure on the inlet conduit 33 remains constant. The pressure in the capacity chamber 35 is fed through the conduit 37 and restriction 38 to the outlet conduit 29 of chamber 27. The pressure in the conduit 29 will be the pressure on the tap on the pressure divider 32 in the absence of some other controlling function. Thus, if the pressure in the capacity chamber 35 is set to be 9 p.s.i., this pressure will be the pressure in the conduit 29 applied to the relay 30. This same pressure condition will also exist within the space 27 of the enclosure 25. If the bellows 28 should expand or contract slowly, the pressure condition in the space 27, conduit 29 and input of relay 30 will remain substantially constant at the tap pressure from the divider 32.

If a cyclically varying pressure signal is applied to conduit 17 so that the pressure in the space 26 is cycling at a rate exceeding a predetermined value, the fluctuating volume changes of the space 27 will be reflected through the conduit 29 to the relay 30 so that the output of the relay 30 will follow the cyclic input signal from the conduit 17. Whether or not the output pressure in the conduit 29 will respond to a particular oscillating input signal will depend in part upon the adjustment of the restriction 38. If the restriction 38 is open, the pressure in the conduit 29 should remain constant even for relatively high input frequencies. On the other hand, if the restriction 38 is extremely small so that it constitutes a high resistance, the frequency of the input signals may be relatively low.

For practical operation, the resistance of the restrictions 34 and 36 should be much smaller than the resistance of the restriction 38. It will be readily apparent that for very low frequencies, the filter will have substantially no cyclic output. For high frequencies, the filter will have low attenuation of the input frequency signal. Between the very low and high frequency range, the input signal will be attenuated depending on its frequency rate.

The theory of operation of the high pass filter 18A is this. The volume or capacity of the chamber 27 is designed to be very small, the volume or capacity of pipe 29 and of the input chamber to the relay 30 is designed to be negligible, and the volume or capacity of chamber 35 is designed to be large.

If restriction 38 is closed, a change in pressure in the space 26 causes a corresponding change in pressure in chamber 27, in pipe 29, and in the input chamber to relay 30. Since the fluid cannot escape from chamber 27, pipe 29, nor the input chamber to relay 30, relay 30 operates in response to the change in the pressure of the fluid and, in turn, operates instability computer 18C.

If restriction 38 is fully open, a change in pressure in the space 26 will not cause a corresponding change in the pressure of the fluid in the input chamber to relay 30 because the volume or capacity of the chamber 35, which is relatively large, has been added to the volume or capacity of chamber 27, pipe 29, and the input chamber to relay 30. Therefore, a change in pressure in the space 26 causes only a negligible change in the pressure in the input chamber to relay 30 and does not operate relay 30.

If restriction 38 is open to an intermediate extent, so that the resistance of restriction 38 to the flow of fluid through it is larger than the resistance of restriction 34 or of restriction 36, a change in pressure in space 26 causes a corresponding change in the pressure in the input chamber to relay 30 because the change in pressure in space 26, in pipe 29, and in the input chamber to relay 30 cannot escape through restriction 38 rapidly enough to prevent the change in pressure in the input chamber to relay 30 from operating relay 30.

The time which it takes for a number of repeated changes in the pressure in space 26 to cause a corresponding change in the pressure in the input chamber to relay 30 can be varied by opening restriction 38 more or less widely. Therefore, the frequency which filter 18 will pass can be varied.

The transfer function of the transducer formed by space 26, bellows 28, and chamber 27 can be expressed mathematically as follows:

$$\frac{Po}{Pi} = \frac{2R(A^2/k) \text{ multiplied by } s}{2R(A^2/k + v/po) \text{ multiplied by } (s+1)}$$

Wherein:
R is the resistance to fluid flow through restriction 38
Po is the pressure in space 27 in absolute units of pressure
Pi is the pressure in space 26 in absolute units of pressure
A is the effective area of bellows 28
k is the effective spring gradient of bellows 28
v is the capacitance of space 27
s is the operator $d/dt$ The frequency response according to the above formula measured below zero decibels at a rate of 6 decibels per octave is:

$$\frac{1}{1 + v/po \text{ multiplied by } k/A^2}$$

It will be readily apparent from the foregoing that there has been provided a new and novel high pass filter which is very flexible and adaptable for use in any place where a high frequency input signal is to be detected.

While, in accordance with the provisions of the statutes, there has been illustrated and described the best forms of the embodiment of the invention known, it will be apparent to those skilled in the art that changes may be made in the forms of the apparatus without departing from the spirit of the invention as set forth in the appended claims and that in some cases certain features of the invention may be used to advantage without a corresponding use of other features.

Having now described the invention, what is claimed as new and for which it is desired to secure Letters Patent is:

1. Apparatus for use in a self adjusting controller comprising a first chamber, a pressure expandible means in said chamber dividing said chamber into two sections, an input variable connection to one of said sections, an output conduit connected from the other of said sections to a utilization device, means connected to supply a pressure signal connecting with said output connection and comprising a pressure divider supplied with fluid under pressure, a tap on said divider and a restricted fluid connection between said tap and said output connection.

2. A fluid pressure high pass filter comprising a pair of interconnected chambers, one of which is a driving chamber and the other of which is a driven chamber, an output connection from said driven chamber to a utilization device, and a fluid pressure supply means connected to said output connection to maintain a predetermined fluid pressure therein when said driven chamber is driven at an alternating frequency rate less than a predetermined amount.

3. Apparatus as defined in claim 2 wherein said fluid pressure supply means comprises a fluid pressure divider with a tap thereon connected to said output connection.

4. Apparatus as defined in claim 2 wherein said fluid pressure supply means comprises a fluid pressure divider, a tap on said divider connected to said output connection, and a fluid resistance unit connected in said tap.

5. Apparatus for producing an output fluid pressure signal of varying amplitude when the frequency of an input signal is greater than a predetermined amount comprising a pair of interconnected pressure chambers, one of which is a driving chamber supplied with an input signal and the other of which is a driven chamber, a fluid pressure utilization device connected to an output from said driven chamber, and means for maintaining a uniform pressure in said output when the frequency of the input signal is less than a predetermined amount, said means comprising a fluid pressure divider, a fluid tap on said divider and connecting said divider to said output, a capacity chamber connected to said divider at said tap, and a fluid restriction connected in said tap.

6. Apparatus as defined in claim 5 wherein said fluid restriction has a fluid resistance which is higher in magnitude than the resistance of said fluid pressure divider.

7. A high pass signal filter comprising a deflectable input member arranged to have a deflecting signal applied thereto, a chamber having said member positioned therein so that the volume of said chamber will change with the deflections of said member, an output fluid connection from said chamber to a utilization apparatus, and means for maintaining a constant fluid pressure in said fluid connection when the frequency of the input deflecting signal is below a predetermined value, said means comprising a fluid pressure source connected to said output fluid connection through a fluid restriction.

8. Apparatus as defined in claim 7 wherein said fluid pressure source comprises a pressure divider having a capacity chamber connected thereto with said fluid restriction connected to said capacity chamber.

9. Apparatus as defined in claim 8 wherein said pressure divider comprises a pair of adjustable restrictions in a fluid flow line.

References Cited in the file of this patent
UNITED STATES PATENTS

| | | |
|---|---|---|
| 2,638,911 | Griswold et al. | May 19, 1953 |
| 2,701,576 | Higgins | Feb. 8, 1955 |